(12) United States Patent
Staggs (10) Patent No.: US 6,708,090 B2
(45) Date of Patent: Mar. 16, 2004

(54) METHOD, APPARATUS AND COMPUTER PROGRAM PRODUCT FOR MANAGING LINE-OF-SIGHT COMMUNICATIONS

(75) Inventor: Thomas J. Staggs, Woodinville, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/795,277

(22) Filed: Feb. 27, 2001

(65) Prior Publication Data

US 2001/0047229 A1 Nov. 29, 2001

Related U.S. Application Data

(60) Provisional application No. 60/185,814, filed on Feb. 29, 2000.

(51) Int. Cl.⁷ .............................. G06F 7/70; H04Q 7/20
(52) U.S. Cl. ................... 701/3; 701/4; 455/61
(58) Field of Search ............................ 701/3, 4, 9, 301, 701/207, 225, 300, 213, 218, 120, 14; 455/61, 430, 431; 340/970, 973, 993; 342/29, 32, 36, 455, 357.09

(56) References Cited

U.S. PATENT DOCUMENTS

| | | | | |
|---|---|---|---|---|
| 4,232,313 A | * | 11/1980 | Fleishman | 343/6 R |
| 4,729,737 A | * | 3/1988 | Reagan et al. | 434/35 |
| 5,111,400 A | * | 5/1992 | Yoder | 364/424.01 |
| 5,450,329 A | * | 9/1995 | Tanner | 364/449 |
| 5,636,123 A | * | 6/1997 | Rich et al. | 364/461 |
| 5,839,080 A | * | 11/1998 | Muller et al. | 701/9 |
| 6,253,064 B1 | * | 6/2001 | Monroe | 455/66 |
| 6,282,417 B1 | * | 8/2001 | Ward | 455/431 |

* cited by examiner

Primary Examiner—Tan Q. Nguyen
Assistant Examiner—Dalena Tran
(74) Attorney, Agent, or Firm—Honeywell Int'l Inc.

(57) ABSTRACT

A signal processing device references a database of communication/navigation facilities and determines if communications are available with that facility given a current position of the user.

33 Claims, 4 Drawing Sheets

METHOD, APPARATUS AND COMPUTER PROGRAM PRODUCT FOR MANAGING LINE-OF-SIGHT COMMUNICATIONS

CROSS-REFERENCES TO RELATED APPLICATIONS

This application is related to and claims priority from now abandoned U.S. Application Serial No. 60/185,814, titled: "Method to Determine Real-Time Radio Wave Propagation From Terrain Database," filed Feb. 29, 2000, the entire contents of which are incorporated by reference herein.

BACKGROUND OF THE INVENTION

The present invention relates to communications and in particular to line-of-sight communications for aircraft and other vehicles.

Aircraft rely on numerous radio signals for safe and efficient flight operations. These radio signals include voice communication channels, data link channels, and navigation signals. Except for certain high frequency (HF) spectrum signals capable of over-the-horizon propagation, most of the above referenced radio signals are limited to line-of-sight operations. The relative positions of the transmitter and receiver; as well as the power output of the transmitter thus control whether the line-of-sight signal will be received. An obstruction such as, for example, terrain located between the transmitter and receiver can prevent the reception of these signals.

In certain operations, knowing in advance if a signal can be received is extremely advantageous. For example, when navigating using a ground based navigation signal, the pilot must know when that signal can no longer be relied upon and the next navigation signal along the route must be tuned in. In current operations under instrument flight rules, the pilot accomplishes this task by reference to a paper instrument navigation chart that shows where along the airway the transition from one navigation facility to the next should occur. The chart additionally indicates minimum altitudes where radio reception from the associated navigation facility can be received with guaranteed minimum standards in a worse case environment. Actual performance may be different in various locations or under certain conditions, but the charts do not reflect this information.

Figure 1:
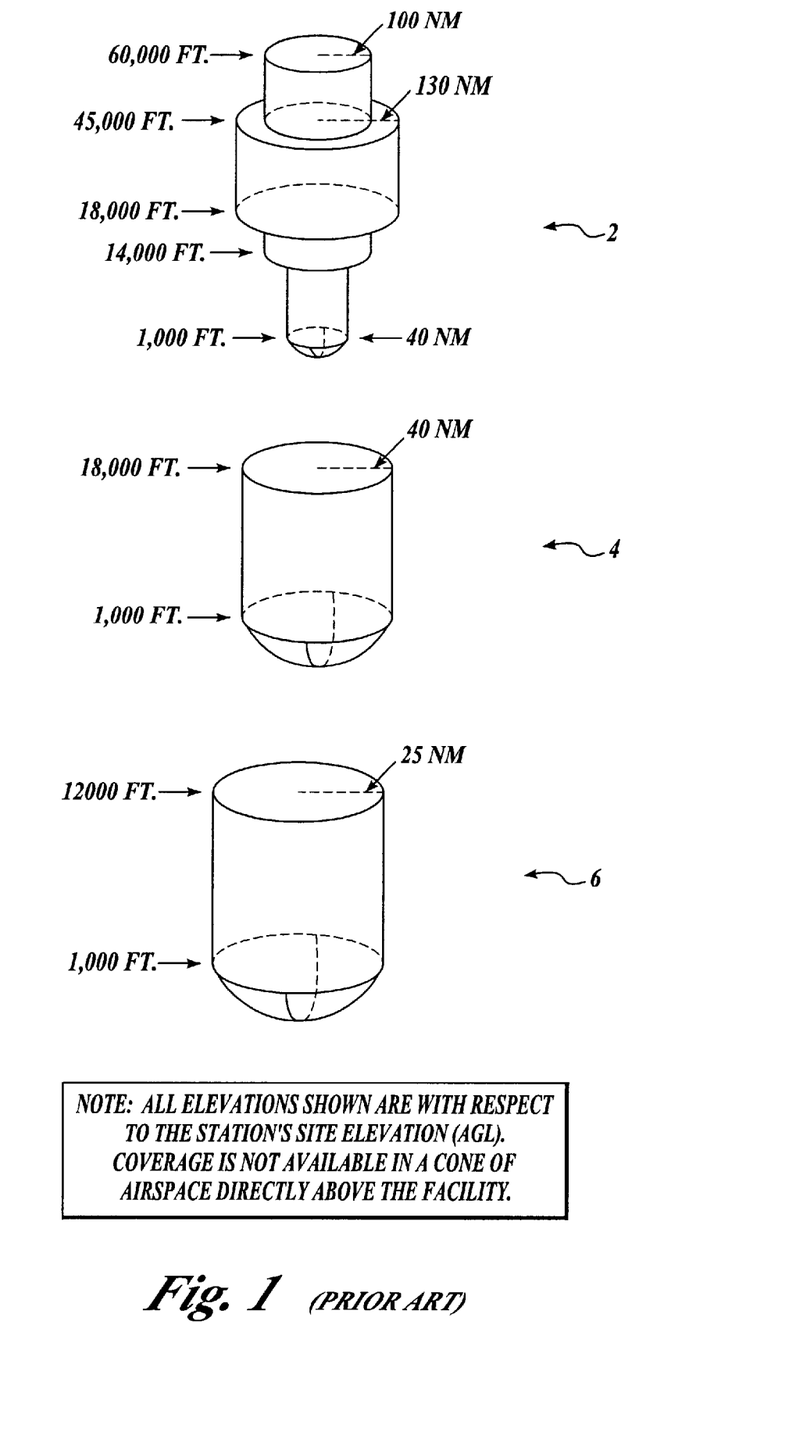
FIG. 1 depicts the standard service volumes for VOR navigation facilities.

However, this process is not without limitations. First, the indication of transition points and minimum reception altitudes are provided only along established air routes and only on instrument navigation charts. Charts used for flights operating under visual flight rules do not contain this information. For flights between points not on an established airway such as RNAV flights and/or flights conducted using visual flight rules charts, the pilot must independently determine whether the flight occurs within the reception limits of the desired navigation facility. The reception limits are set based on the "service volume" of the navigation facility. The "service volume" defines guaranteed areas of reception based on distance from and altitude above the navigation facility. FIG. 1 depicts the standard service volumes for various classes of VOR navigation facilities. A standard high-altitude service volume 2, a standard low altitude service volume 4, and a standard terminal service volume 6 are shown. Table I also lists the standard service volumes for the various classes of nondirectional beacons (NDB).

TABLE I

NDB Service Volumes

| CLASS | DISTANCE (RADIUS) |
|---|---|
| Compass Locator | 15 NM |
| MH | 25 NM |
| H | 50 NM |
| HH | 75 NM |

The volumes in FIG. 1 and Table I are only a general standard. The actual service volume for a particular facility may be different due to local topography. The pilot must therefore consult yet a second document called the "Airport Facilities Directory" prior to flight to determine if the proposed flight can be made using that navigation facility. Theoretically, the pilot should also consult this document if a change in flight plan requires use of a navigation facility other than that originally anticipated.

Figure 2:
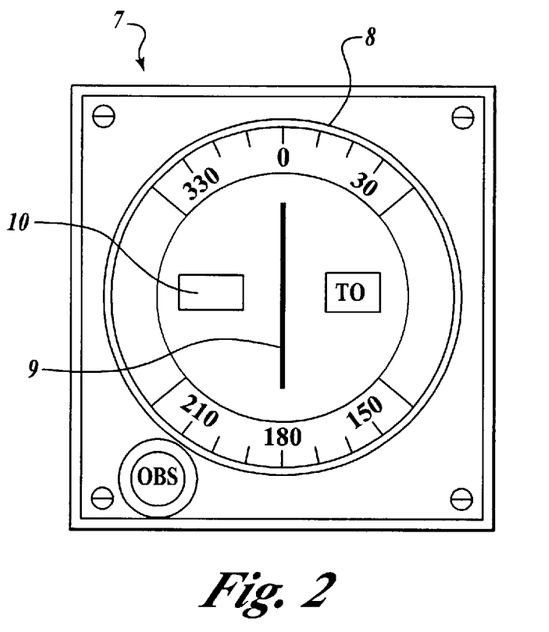
FIG. 2 depicts a course deviation indicator used to navigate with VOR navigation facilities.

Pilots also typically have a visual cue on the cockpit navigation instrument that indicates when a ground-based navigation signal is not being reliably received but have no ability to predict a future loss of signal. FIG. 2 shows a course deviation indicator 7 used to track a VOR navigation signal. Indicator 7 of FIG. 2 includes a course selector card 8, a course deviation bar 9, and a "nav flag" 10. When the aircraft receiver cannot reliably receive the selected VOR station, nav flag 10 appears in the window and indicates that the pilot should not rely on that signal for navigation. The nav flag does not, however, provide the pilot with any information about why the desired signal cannot be received. Similar nav flag devices are used on cockpit indicators used to track glideslope and localizer signals.

Another operation in which relies upon line-of-sight signal reception is voice communications with ground stations. For example, the FAA operates a network of flight service stations throughout the United States. A pilot may contact flight service personnel via radio to activate a flight plan, obtain weather information, or advise of conditions encountered along the route. In practice, the pilot consults the navigation chart to locate the flight service frequency to be used. There may be one or more frequencies indicated on the chart for the region in which the pilot is flying. Often, the pilot tries to contact flight service on one of the indicated frequencies without result because line-of-sight communication is not available to the repeater using that frequency. The pilot must then try additional frequencies until communications are established or change altitude and/or position. This process divides the pilot's attention from the primary task of flying the airplane.

Aircraft and other vehicles also navigate and communicate using satellite-based navigation signals from, for example, GPS, or sat-com devices. For a satellite-based navigation system to provide accurate position information, the satellite receiver must be able to receive, via line-of-sight communications, a sufficient number of satellites and those satellites must be in a distributed geometry. Failure to meet either of these criteria will result in either a degraded or absent navigation solution.

Current GPS technology for instrument flight (IFR) includes RAIM (Receiver Autonomous Integrity Monitoring): an algorithm which looks ahead of own aircraft position based on the planned route of flight to ensure that there will be both a sufficient number and geometry of satellites in the GPS constellation. If a deficiency is predicted by the RAIM algorithm, the pilots are warned, causing them to either change their velocity or to change their flight routing.

The RAIM algorithm, however, takes into account only the relative positions of the satellites and aircraft and does not take into account the topography that will surround the aircraft as it makes it way along the planned flightpath. Consider, for example, a pilot flying from the Midwest, where the terrain is flat, to Missoula, Mont., which is closely surrounded by tall mountains. An on-board IFR GPS performs RAIM calculations and informs the pilot that there will be adequate satellite coverage for the entire route of flight. As the aircraft commences the IFR approach into Missoula, however, it is possible that one or more of the required satellites will be obscured by the mountains surrounding the airfield, leading to a loss of signal and subsequent loss of the navigation solution.

Aircraft flying instrument rules, or under positive control, are also handed off from one aircraft controller to another as the flight progresses. Frequently, the aircraft is unable to raise the next controller on the newly assigned frequency because the handoff has occurred prematurely, or in a region where communications cannot be completed on the newly assigned frequency due to signal blockage by terrain. Communications are thus temporarily lost until the aircraft comes into view of the new ground station. Not only does this present a potential safety hazard, but the controller must spend time trying to raise the aircraft on the radio. This process occasionally involves asking other aircraft to contact the intended aircraft on the assigned frequency. In certain circumstances, the aircraft must even revert to the previously assigned frequency and ask the prior controller for additional instructions.

Search and rescue operations also rely on line-of-sight communications when tracking emergency locator beacons. Emergency locator beacons can be carried by a person on the ground or, more commonly, are located on an airplane. After an accident or crash, the beacon activates and emits a signal on a predefined frequency. Satellites are tuned to listen on these frequencies, and with each pass, fix the position of the beacon. The satellite fixes are approximate, however, and aircraft are often used to overfly the area and precisely determine the position of the beacon and locate survivors. If the aircraft flies too low, the beacon signal cannot be heard, and the time required to locate the accident scene increases. If the aircraft flies too high, search crews may encounter difficulties in spotting survivors and wreckage.

Military formation flying also relies on line of sight communications. The pilots of these craft use voice communications to maintain separation and coordinate maneuvers. Loss of communications can occur when a portion of the formation flies behind terrain. Military operations in or near hostile territory also have no way of knowing whether their radio communications can be monitored by unfriendly ground forces.

SUMMARY OF THE INVENTION

The present invention recognizes the problems inherent in the prior art and improves the utility of line-of-sight communications.

According to one aspect of the present invention, the invention references a database containing the service volumes of ground-based navigation aids. The service volumes of one or more of the ground based communication/navigation facilities may be displayed on a display. The user thus knows whether communications are possible with that facility.

According to another aspect of the present invention, the invention references a database of terrain features and communication/navigation sites. The invention determines if line-of-sight communications are possible on a real-time basis between the chosen communication/navigation facility and the aircraft or vehicle.

According to yet another aspect of the present invention, the invention references a terrain database and can determine the minimum altitude required to maintain line-of-sight communications with a chosen facility. In this manner, the present invention assists, for example, in locating the origin of an emergency locator beacon signal by indicating the minimum altitude from which an overhead search can be conducted while still remaining in reception range of the beacon signal. This aspect of the present invention additionally assists with communication and navigation during certain emergency operations. For example, if a descent is required due to an engine out condition or depressurization, the pilot can receive information about what minimum altitude to maintain in order to remain in communication with the desired communication/navigation facility.

According to yet another aspect of the invention, the invention can provide the pilots of military aircraft an indication of whether the flight path remains clear of enemy listening posts. Thus, the military pilots may communicate with other friendly aircraft while the enemy is prevented from eavesdropping on those conversations. In a preferred embodiment of the invention, the invention enables the aircraft communication gear only when not in view of enemy listening posts and when in view of other aircraft in the formation. The present invention thus additionally enables the pilot to predict or be provided an alert of an upcoming loss of communications and/or when communications can be received by hostile forces.

According to still another aspect of the invention, the invention may modulate signal strength to that required to maintain contact with the desired station thereby conserving transmission power. In military applications, the present invention may modulate power to ensure that communications are received by friendly stations but are not received at enemy listening posts.

Further advantages and features of the present invention will be described in greater detail below with reference to the drawings.

DESCRIPTION OF THE SPECIFIC EMBODIMENTS

Figure 3:
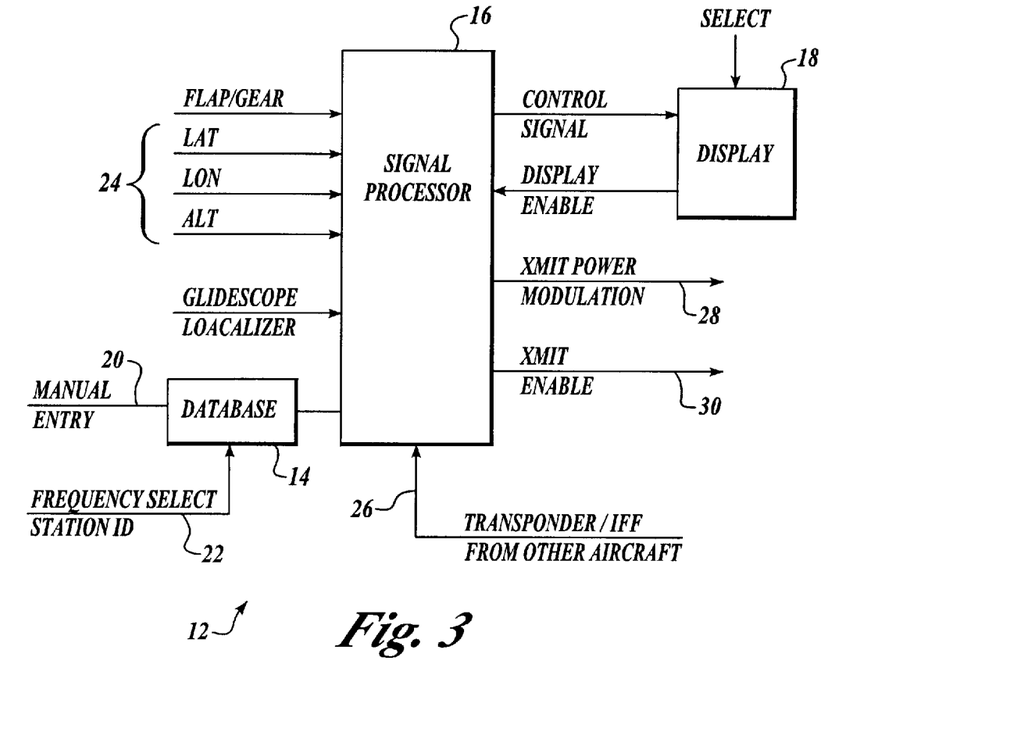
FIG. 3 is a block level diagram of a system for managing line-of-sight communications according to an embodiment of the present invention.

FIG. 3 is a block diagram of a system 12 for managing line-of-sight communications according to an embodiment of the present invention. In the embodiment of FIG. 3, system 12 includes a database 14, a signal processing device 16, and an optional display 18. Database 14 may include communication/navigation facility data, terrain data or any combination thereof. The term "communication/navigation facility" as used throughout this document includes navigation facilities, and/or voice communication facilities and/or satellite-based communication systems or navigation aids and/or other ground based communication facilities for using line-of-sight communications. When included in database 14, the communication/navigation facility data includes the location/elevation of the facility and data on the performance characteristics of the facility, including the frequency of the facility. The antenna height and sensitivity if appropriate, may additionally be included in the performance data. Database 14 performance data may optionally include the published service volumes of the facilities and/or the transmission power of the facility. Construction of a terrain database suitable for use in the present invention is described in U.S. Pat. No. 5,839,080 the entire contents of which are hereby incorporated by reference for all purposes.

In a preferred embodiment of the invention, database 14 comprises a PCMCIA data card which may be periodically updated or replaced to reflect new information. Other data storage media known to those of skill in the art may also be used, such as, for example, optical media or flash memory. Database 14 may also include a manual entry option 20. Manual entry 20 allows facility data, not normally included in database 14, to be added. Examples of such data include the location of enemy listening posts, friendly military communications posts and/or emergency locator beacon estimated position.

Database 14 outputs the facility data for the selected facility and/or for all facilities located proximate the aircraft to signal processor 16. A frequency select or station identifier signal 22 is supplied to database 14 to identify specific facility(s) for which data is requested. The frequency(s) selected may be read from anyone or all of the aircraft's communication and navigation radios or flight management system (FMS). Station identifiers may also be used when available to precisely select the navigation facility from database 14. In the absence of a specific station identifier, or when multiple occurrences of a station identifier exist in database 14, database 14 forwards all candidate station data to signal processor 16. Signal processor 16 then selects the appropriate facility data based on the aircraft position.

In a preferred embodiment of the invention, signal processor 16 comprises a general purpose processor. Signal processor 16 may optionally comprise software or other executable code, firmware, or other electronic microcircuitry, or an analog circuit. According to a preferred embodiment of the invention, signal processor 16 comprises an Enhanced Ground Proximity Warning Computer (EGPWS). The advantage of using the EGPWS computer includes access to a terrain database, aircraft position data and control signals for driving a display. Thus, the present invention can readily be incorporated therein with minimal modification. A Traffic Collision Avoidance System (TCAS) is also an aircraft system readily adaptable for use with the present invention. Like the EGPWS computer, the TCAS device includes a general purpose processor, memory and control signals for driving a display. The TCAS computer also receives transponder signals, and for reasons to be explained below, may be preferable for hosting the invention in military applications.

In addition to the terrain and/or facility data received from database 14, signal processor 16 receives aircraft position data 24; preferably in the form of latitude, longitude and altitude. Aircraft position data may be obtained from aircraft navigation systems such as inertial navigation systems, satellite based positioning system data, LORAN, VOR/DME, DME/DME, or other navigational fix as known to those of skill in the art. Altitude data may be obtained from the aircraft barometric altimeter, from a satellite based positioning system, or inertial navigation system. Preferably, the altitude data is filtered to obtain a blended altitude value to minimize the altitude errors associated with any one system of measure. Copending U.S. patent application Ser. No. 09/255,670 (entitled "Method and Apparatus for Determining Altitude") describes one such system for obtaining a filtered altitude value.

Signal processor 16 may additionally receive transponder signals, Automatic Dependent Surveillance System (ADS-B) signals or Identification Friend or Foe (IFF) signals 26 from other aircraft. Transponder signals 26 provide signal processor 16 with the relative position and altitude data from other aircraft and are useful for enabling signal processor 16 to determine if communications are possible with those other aircraft. The ADS-B signal provides flight plan data and the actual position of the other aircraft. The IFF signal identifies whether the aircraft is a friendly or hostile aircraft. When the transponder/IFF/ADS-B signal is being received, line-of-sight communications are possible with the second aircraft. When the transponder/IFF/ADS-B signal is no longer being received, line-of-sight communications are no longer possible with the second aircraft. The last known position and velocity vectors transmitted from the second aircraft can then be used to calculate an estimated position or estimated flight path of the second aircraft as well as providing an estimate of when communications are likely to be regained.

Signal processor 16 compares the position of the aircraft with the position of the selected facility and intervening terrain and determines if line-of-sight communications are possible with the selected facility. If the service volume data for the facility is available, signal processor 16 determines whether the current aircraft position is located within that service volume. If the aircraft is located within the service volume, communications are possible with that facility.

If no service volume data is available, signal processor 16 constructs a mathematical, or virtual line, from the aircraft current position to the facility or second aircraft. If coordinates for terrain or other obstructions contained in database 14 are located along that line, line-of-sight communications with that facility are not available. If power output data is available for the facility, the length of the mathematical line extending from the facility can be truncated to represent the maximum transmit range of the facility. If the line does not extend completely to the aircraft two way line-of-sight communications are not does not extend completely to the aircraft two way line-of-sight communications are not possible with that facility. Optionally, signal processor 16 can simply compare the distance, as represented by the length of the mathematical line connecting the aircraft with the facility to the maximum transmitting range of the facility or aircraft. If the distance is greater than the transmit range, communications are not possible with that facility.

According to one possible embodiment of the invention, signal processor 16 may optionally output transmitter control signals 28 and/or 29. Transmit power modulator signal 29 may be used to modulate the power output of the transmitter. In military or covert operations this feature enables communications with friendly communication/navigation facilities or aircraft while limiting detection by hostile facilities. Transmit enable signal 29 may be used to inhibit the aircraft communications transmitter when signal processor 16 determines that such transmissions are within line-of-sight reception of hostile listening posts. Conversely, signal processor 16 can be configured to enable the aircraft transmitter only when communications are possible with the chosen aircraft or facility. Thus, the present invention reduces the risk of detection by hostile forces during military or other covert operations.

In a preferred embodiment of the invention, signal processor 16 outputs a control signal to display the line-of-sight information on a cockpit display 18. Cockpit display 18 is preferably an electronic display of the liquid crystal display type. Display 18 may also be a cathode ray tube display, plasma charged display or other flat panel display known to those of skill in the art. FIGS. 4–7 show various displays useful for depicting the line-of-sight data in various applications. Cockpit display 18 may comprise a moving map display, a terrain awareness display, weather radar display or other displays capable of displaying graphical information. A select signal may be used by the pilot to enable display of the communications data on the display.

Figure 4:
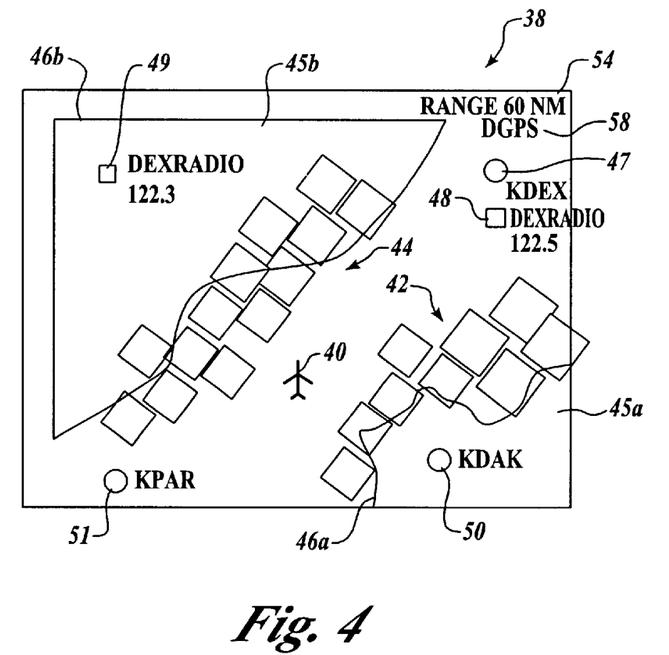
FIG. 4 depicts a display of line-of-sight data useful for communication with ground based navigation and communication aids according to an embodiment of the present invention.

In the display of FIG. 4, an ownship symbol 40 indicates the position of the aircraft. Display 41 may optionally show terrain proximate the aircraft as shown by regions 42 and 44. Terrain regions 42 and 44 may be shown in the manner commonly used on terrain awareness systems such as, for example, Enhanced Ground Proximity Warning Systems as described in U.S. Pat. No. 5,839,080. Regions 42 and 44 may be colored according to the degree of terrain threat to the aircraft. Areas 45a and 45b for which line of sight communications are not available are bounded by solid lines 46a and 46b respectively. A plurality of communication/navigation facilities 47–51 are additionally shown on display 41. The facilities 47–51 shown on display 41 of FIG. 4 may comprise all those facilities stored within database 14 that are geographically located within the display image boundary. The display boundary, or range, can be selected by the pilot and is shown in region 54 in the upper right of display 41. Optionally, and to limit clutter on the display, display 41 may display only those communication/navigation facilities which are currently tuned on one of the aircraft communication/navigation radios. Intermediate choices of which facilities to display are also possible. For example, the present invention may be configured to display those facilities currently tuned on the communication/navigation radios plus the next closest communication or navigation facility.

The facilities 47–51 may be additionally colored to denote whether or not communications are possible with that facility. For example, flight service repeater station 49 and VOR KDAK 50 are both located in regions blocked from line-of-sight communications with aircraft 40. Station 49 and VOR 50 may therefore be colored red to indicate communications are not currently possible with that facility. Display 41 of FIG. 4, may also be optionally configured by signal processor 16 to show those facilities with which communications are not possible even though they remain in line of sight view of aircraft 40. In the example of FIG. 2, VOR KPAR 50 may therefore be colored red to indicate communications are not possible with that facility either because aircraft 40 is located outside the service volume of that facility or because database 14 contains Notice to Airmen (NOTAM) data that indicates facility 51 is unavailable for use. The invention may optionally include an additional feature whereby the pilot can slew a curser over a presently unavailable facility. Once positioned over the facility, a text message appears informing the pilot of how far to climb or descend to be in communication range of the facility.

Serviceable facilities for which line of sight communications are available and the service volumes of which encompass aircraft 40 may be colored green to indicate the availability of such stations. In the example of FIG. 2, VOR KDEX 47 and flight service repeater station 48 would therefore be colored green to indicate communication with these facilities is possible. The curser feature described above may also be used to indicate how far to climb or descend to exit the communication range of the selected facility. This feature would be of particular value during military operations when the pilot is attempting to remain clear of hostile radar or listening posts.

Display 41 of FIG. 4 may additionally include a graphics or text message 58. Message 58 may be used to indicate to the pilot the availability of satellite-based navigation aids or accuracy enhancing navigation signals such as differential global positioning signals or microwave landing signals. Message 58 may also be used to alert the pilot to predicted loss of signal with the currently tuned facility. For example, the name of the facility can be displayed in region 58 with a color code or an associated text message to indicate that the communication with that facility or system will be lost in a predetermined number of seconds.

In a preferred embodiment of the invention as shown in FIG. 4, region 58 displays the text message "DGPS" in green when differential GPS signals are available. The invention displays a red and/or flashing "DGPS" signal when differential GPS signals are not available. The invention can be additionally configured to display region 58 in only those conditions such as landing, where their use is critical. The landing condition may be detected by supplying signal processor 16 with signals indicating the flap and gear position of the aircraft and/or by noting whether the aircraft is tracking a glideslope or localizer signal. When signal processing device 16 comprises a ground proximity warning computer, this data is already supplied to signal processing device 16 and no additional connections or wiring are required.

Figure 5:
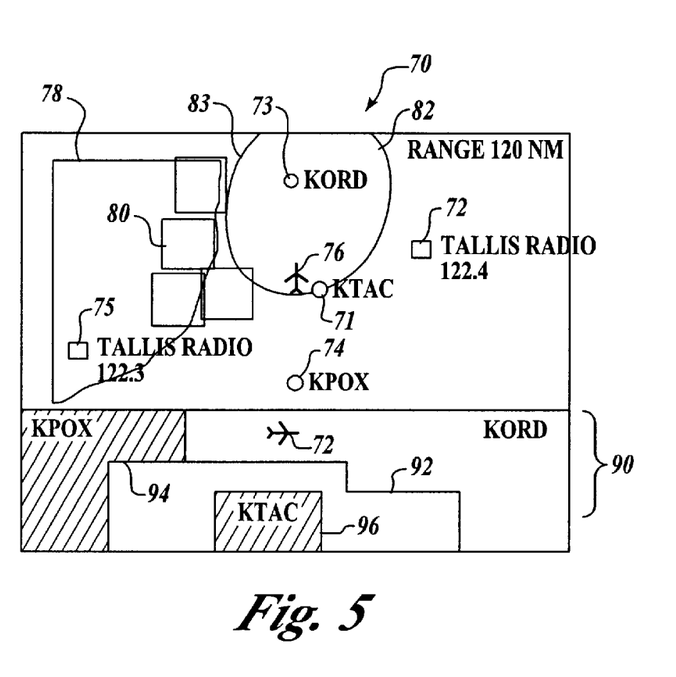
FIG. 5 depicts a display of service volume data and a vertical profile display according to an embodiment of the present invention.

FIG. 5 depicts an alternate display format 70 according to another embodiment of the present invention. Display 70 depicts a plurality of communications/navigation facilities 71–75 displayed relative to ownship symbol 76. As described in reference to FIG. 4, navigation facilities 71–75 may include only those facilities presently tuned on the aircraft radio or those facilities contained in the database proximate the position of the aircraft. Facilities 71–75 may also be colored to indicate whether communications are available with the aircraft in the manner previously described. A line-of-sight boundary 78 is also shown in FIG. 5. Terrain data 80 may optionally be displayed. In the example display of FIG. 5, display 70 additionally includes a region 82 that indicates the service volume of VOR KORD 73 at the current altitude of the aircraft. Note that region 82 is not symmetrical about the VOR. The region 83 adjacent terrain 80 limits the service volume of VOR 73 and this is depicted on display 70. Such information may prove useful to a pilot during a missed approach procedure or when navigating at other than nominal airway altitudes perhaps due to icing conditions.

The present invention may optionally include a vertical profile display 90 as shown in the example display 70.

Vertical profile display 90 illustrates those navigation/communications facilities located along the airway on which the aircraft is flying. Optionally, vertical profile display 90 illustrates these facilities within six miles of either side of the aircraft track. In this manner, the transition point from one navigation aid to another along the airway or route can easily be identified. The service volume 92 for VOR KORD 73 is shown in a first color and/or shading to indicate that aircraft 76 can communicate with that facility. The service volume 94 for VOR KPOX 74 is shown in a second color and/or shading to indicate that aircraft has passed the transition point on the airway from which navigation from VOR KPOX 74 is recommended.

Also shown on vertical profile display 90 of FIG. 5 is the service volume 96 of VOR KTAC 71. In the example of FIG. 5, VOR 71 is a terminal VOR used for navigation to an airport located along the airway. Aircraft 76 is currently above service volume 96 of VOR 71 and service volume 96 is colored and/or shaded to indicate that navigation using VOR 71 is not advisable.

Figure 6:
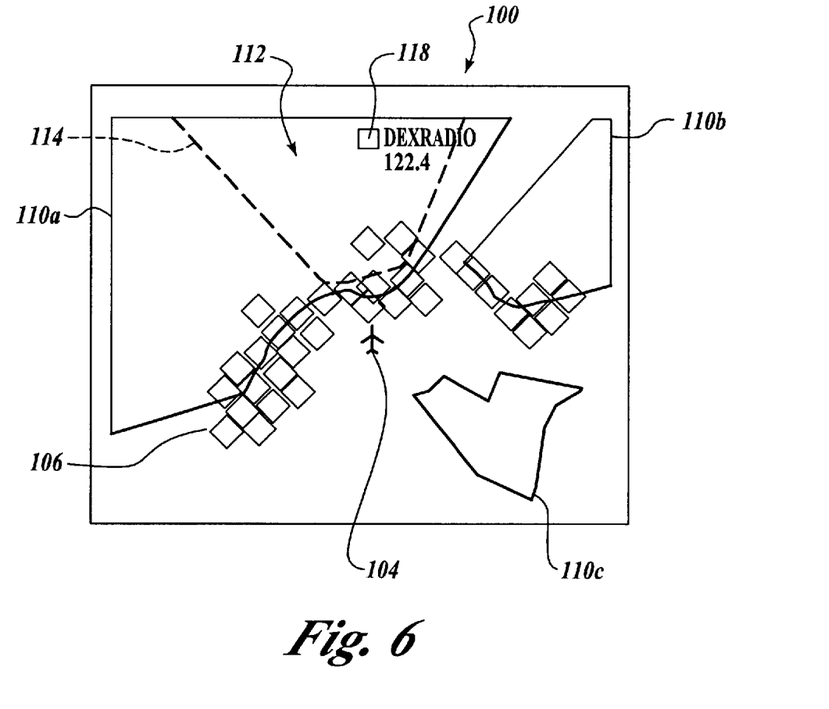
FIG. 6 depicts a display of how line-of-sight data changes with altitude applications according to an embodiment of the present invention.

FIG. 6 shows yet another embodiment of the display of the present invention. The display 100 of FIG. 6 includes ownship symbol 104, terrain display 106 and boundaries 110*a*–*c* to indicate areas not within line-of-sight communication with aircraft 104. In addition, display 100 further includes a region 112 demarcated by dashed line 114. Region 112 indicates additional areas that would be available for line-of-sight communications if the aircraft where to climb a predetermined amount. In a preferred embodiment, region 112 indicates areas that would be added to the line-of-sight communications areas if the aircraft climbed 1000 feet. Display 100 may be of particular use in search and rescue operations when searching for, or in the region surrounding, an emergency locator beacon. Display 100 may also be useful when trying to establish voice communications with air traffic control or flight service. In the example of FIG. 6, flight service communications repeater facility 118 is not presently visible to aircraft 100 but placing the aircraft 1000 feet higher enables communication with flight service.

Figure 7:
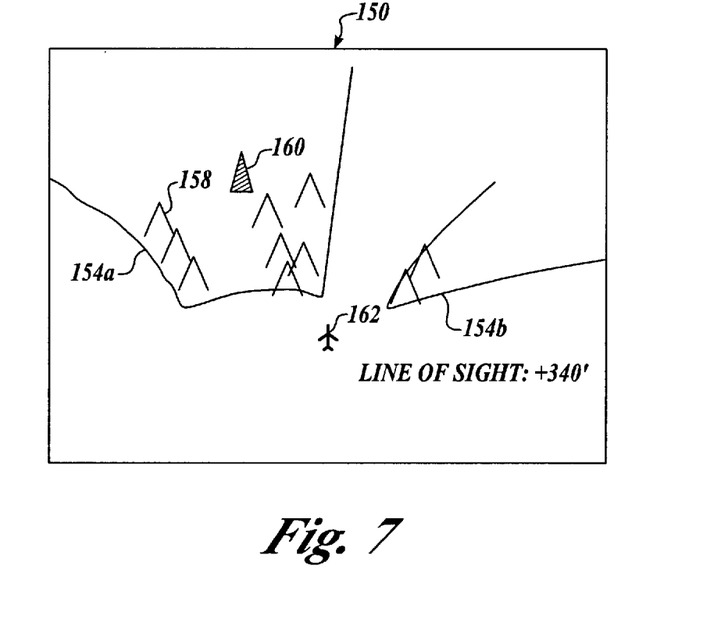
FIG. 7 depicts a display of line-of-sight data useful in aircraft to aircraft communications according to an embodiment of the present invention.

FIG. 7 illustrates a display 150 useful for maintaining communications between aircraft such as would occur in formation flights. Boundary lines 154*a* and 154*b* indicate those regions in which line of sight communications are not possible due to obstructions such as terrain. In display 150 terrain is shown using symbology 158. Symbology 158 merely illustrates an alternative method for depicting terrain on the display and is suitable for use with any of the displays of the present invention. Conversely, terrain may be shown on display 150 using the graphical display shown in any of FIGS. 4–6. Although not shown in FIG. 7, display 150 may optionally depict the locations of known hostile and friendly listening posts and other communications/navigation facilities in the manner previously described. A second aircraft symbol 160 on display 150 shows the estimated position of an aircraft that has lost radio contact with the aircraft represented by ownship symbol 162. The estimated position of aircraft 160 may be derived from the last known position and velocity vector of aircraft 160 or from flight plan data. Position and velocity vectors can be obtained from the transponder data of aircraft 160, or estimated from previously obtained radar returns.

Preferred embodiments of the present invention have now been described. Variations and modifications will be readily apparent to those of ordinary skill in the art. For example, although the present invention has been explained in terms of aircraft operations, one of ordinary skill can readily see that the present invention is adaptable for use in surface vehicles. The present invention may thus be especially useful in military ground operations and troop movements. For these reasons the invention should be interpreted in light of the claims.

What is claimed is:

1. A method for improving vehicle communications comprising the steps of:
    deriving current position data of a vehicle;
    accessing location and performance data for a communication/navigation facility stored in a database;
    accessing terrain data stored in said database;
    comparing said position data with said location and performance data of said communication/navigation facility and said terrain data and determining if said vehicle is in line of sight communication range of said communication/navigation facility;
    displaying on a display regions where line-of-sight communications are unavailable; and
    displaying on said display additional regions where line-of-sight communications would be possible if an altitude of the vehicle increased by a predetermined amount.

2. The method of claim 1 further comprising the step of displaying on said display an estimated position of a second vehicle.

3. The method of claim 1 further comprising the step of displaying on a display a vertical profile view of communication/navigation facility service volumes.

4. The method of claim 1 further comprising the step of displaying on said display terrain proximate the vehicle.

5. The method of claim 1 further comprising the step of displaying on a display a service volume of said communication/navigation facilities proximate the vehicle.

6. The method of claim 1 wherein said vehicle is an aircraft.

7. The method of claim 1 wherein said display comprises a moving map display.

8. The method of claim 1 wherein said display comprises a moving map display.

9. The method of claim 1, wherein said step of comparing comprises determining if said vehicle is in line-of-sight of said communication/navigation facility.

10. The method of claim 1 further comprising the step of controlling a power output of a vehicle radio transmitter.

11. The method of claim 1 further comprising the step of enabling/disabling a vehicle radio transmitter as a function of whether the vehicle is in communication range of said communication/navigation facility.

12. An apparatus for aircraft comprising:
    an input coupled to receive signals indicative of a position of an aircraft, said signals being derived on board the aircraft, and data from a database of terrain and of communication/navigation facilities;
    an output; and
    a signal processor coupled to said input and to said database and to said output comparing said position with a location and performance data of said communication/navigation facilities and said terrain data and determining if the aircraft can communicate with said facilities; and
    outputting a control signal useful for controlling a display to display said communication/navigation facilities proximate the vehicle to indicate on said display which ones of said communication/navigation facilities proximate the aircraft are in communications range of the aircraft, to display regions where line-of sight communications are unavailable, and to display additional regions where line-of-sight communications would be possible if an altitude of the aircraft were increased by a predetermined amount.

13. The apparatus of claim 12 wherein said control signal controls said display to display a service volume of said communication/navigation facilities proximate the aircraft.

14. The apparatus of claim 12 wherein said input is coupled to receive a position of a second aircraft and wherein said control signal controls said display to display an estimated position of said second aircraft.

15. The apparatus of claim 12 wherein said control signal controls said display to display a vertical profile view of navigation facility service volumes.

16. The apparatus of claim 12 wherein said control signal controls said display to display terrain proximate the vehicle.

17. The apparatus of claim 12 wherein said signal processor comprises a terrain awareness system computer.

18. The apparatus of claim 12 wherein said signal processor comprises a Traffic Collision Avoidance System computer.

19. An apparatus for aircraft comprising:
an input coupled to receive signals indicative of a position of the aircraft and data from a database of terrain and of communication/navigation facilities;
an output; and
a signal processor coupled to said input and to said database and to said output for:
comparing said position with a location and performance data of said communication/navigation facilities and said terrain data and determining if the aircraft can communicate with said facilities;
outputting a control signal useful for controlling a display to display said communication/navigation facilities proximate the vehicle to indicate on said display which ones of said communication/navigation facilities proximate the aircraft are in communications range of the aircraft; and
outputting a control signal for preventing an aircraft transmitter from transmitting as a function of whether the aircraft can communicate with a given communication/navigation facility.

20. A computer program product comprising:
a computer readable storage medium having computer readable program code means embodied in said medium, said computer readable program code means having:
a first computer instruction means for accessing stored location and performance data for a communication/navigation facility;
a second computer instruction means for accessing a terrain data;
a third computer instruction means for accessing at least a current position data of a vehicle said current position data being derived on board the aircraft;
a fourth computer instruction means for comparing said position data with said location and performance data and determining if said vehicle is in communication range of said communication/navigation facility;
a fifth computer instruction means for controlling display of a region where line-of-sight communications are unavailable on a display: and
a sixth computer instruction means for controlling display of a second region where line-of-sight communications would be available if an altitude of the vehicle increased by a predetermined amount.

21. The computer program product of claim 20 further comprising a seventh computer instruction means for controlling display of a service volume of said communication/navigation facility on a display.

22. The computer program product of claim 20 further comprising a seventh computer instruction means for controlling display of said terrain data on a display.

23. The computer program product of claim 20 further comprising:
a seventh computer instruction means for controlling display of a plurality of communication/navigation facilities proximate the vehicle; and
an eigth computer instruction means for controlling said display to indicate which ones of said plurality of communication/navigation facilities are in communication range of the vehicle.

24. The computer program product of claim 20 further comprising a seventh computer instruction means to control when a vehicle radio transmitter is enabled as a function of whether said vehicle is in communication range of said communication/navigation facility.

25. The computer program product of claim 20 further comprising a seventh computer instruction means to control a power output of a vehicle radio transmitter.

26. An electronic cockpit display for a vehicle comprising:
an own vehicle position derived on board the vehicle;
a plan view illustration demarcating a first region where line-of-sight communications are possible with the vehicle and a second region where line-of sight communications are unavailable with the vehicle, wherein said vehicle is an aircraft: and
a third region shown on the display, demarcating where line-of-sight communications are possible if the vehicle changes altitude by a predetermined amount.

27. The display of claim 26 further comprising a display of terrain proximate the vehicle.

28. An electronic cockpit display for aircraft comprising:
a plan view showing a position of an own aircraft said position being derived on board the aircraft relative to a position of a second aircraft; and
an indication on said display indicating when said second aircraft is in communication range with the own aircraft,
wherein said indication includes displaying said second aircraft in a color to indicate when said second aircraft is in communication range of the own aircraft.

29. The display of claim 28 further comprising a display of terrain proximate the aircraft.

30. The display of claim 28 wherein said indication includes displaying a region in which line-of-sight communications are unavailable to the own aircraft.

31. A method for improving vehicle communications comprising the steps of:
deriving current position data of a vehicle;
accessing location and performance data for a communication/navigation facility stored in a database;
accessing terrain data stored in said database;
comparing said position data with said location and performance data of said communication/navigation facility and said terrain data and determining if said vehicle is in line of sight communication range of said communication/navigation facility; and enabling/disabling a vehicle radio transmitter as a function of whether the vehicle is in communication range of said communication/navigation facility, wherein said display comprises a moving map display.

32. A method for improving vehicle communications comprising the steps of:

deriving current position data of a vehicle;

accessing location and performance data for a communication/navigation facility stored in a database;

accessing terrain data stored in said database; comparing said position data with said location and performance data of said communication/navigation facility and said terrain data and determining if said vehicle is in line of sight communication range of said communication/navigation facility;

displaying on a display regions where line-of-sight communications are unavailable;

displaying on said display additional regions where line-of-sight communications would be possible if an altitude of the vehicle increased by a predetermined amount; and enabling/disabling a vehicle radio transmitter as a function of whether the vehicle is in communication range of said communication/navigation facility.

33. A computer program product comprising:

a computer readable storage medium having computer readable program code means embodied in said medium, said computer readable program code means having:

a first computer instruction means for accessing stored location and performance data for a communication/navigation facility;

a second computer instruction means for accessing a terrain data;

a third computer instruction means for accessing at least a current position data of a vehicle said current position data being derived on board the aircraft;

a fourth computer instruction means for comparing said position data with said location and performance data and determining if said vehicle is in communication range of said communication/navigation facility; and a fifth computer instruction means to control when a vehicle radio transmitter is enabled as a function of whether said vehicle is in communication range of said communication/navigation facility.

* * * * *